April 3, 1928.

J. H. WILLIAMS 1,664,584

ELECTRIC COOKING AND HEATING APPARATUS

Filed April 6. 1925

INVENTOR.
J. H. Williams.
BY J. Edward Maybee
ATTY.

Patented Apr. 3, 1928.

1,664,584

UNITED STATES PATENT OFFICE.

JOHN H. WILLIAMS, OF TORONTO, ONTARIO, CANADA.

ELECTRIC COOKING AND HEATING APPARATUS.

Application filed April 6, 1925, Serial No. 20,988, and in Canada January 5, 1925.

This invention relates to electric cooking and heating apparatus, and the object of the present invention is to devise apparatus which is particularly adapted for use in apartments or rooms where the usual cooking and heating facilities are not readily available, or where there is sickness, and to so arrange the said apparatus that various foods may be cooked simultaneously, and which will at the same time provide a supply of hot water for immediate needs, which may be used as a heater for warming a room, and which will be cheap to manufacture, efficient in use and durable in construction.

Figure 1:
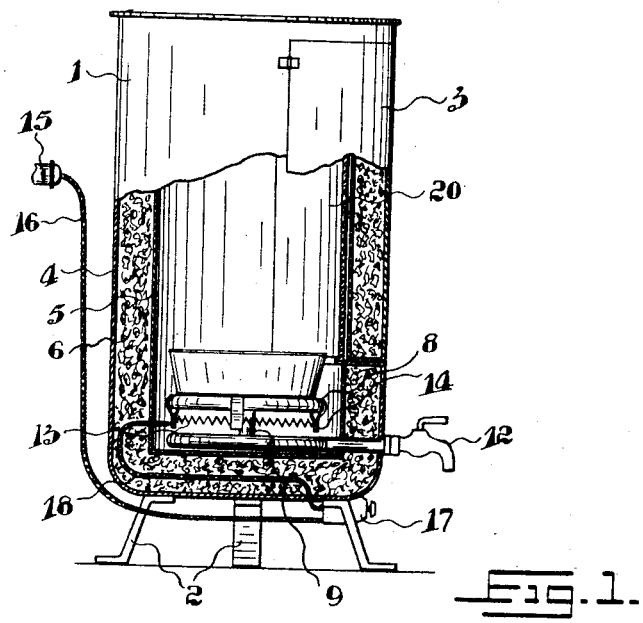
Figure 2:
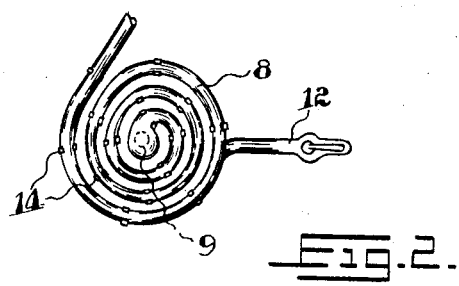

The invention is constructed as hereinafter more specifically described and illustrated in the accompanying drawings in which Figure 1 is a side elevation of the apparatus, the lower part being broken away to disclose the pipe, resistance and contiguous parts; and Figure 2 a plan view of the water heating coil.

In the drawings like numerals of reference indicate corresponding parts in the various figures.

The electric cooking and heating apparatus comprises a casing 1 mounted on suitable legs 2. This casing is provided with a suitable opening in its front adapted to be closed by a door 3. The casing 1 is of double wall construction being formed with the outer wall 4 and inner wall 5, the space between the walls being packed with any suitable insulating material 6, such as corrugated paper board.

Within the casing 1 is located the water heating means, which comprises a pair of coils 8, one above the other in spaced relationship, the inner ends of the coils being connected by a vertical connecting pipe 9. The outer end of the lower coil is provided with a discharge faucet 12, while the outer end of the upper coil is adapted to be connected with an ordinary water service main.

Between the coils is located an electric heating element 13, which is supported from the upper coil by means of clips 14, the element, of course, being suitably insulated where necessary. It will thus be seen that heat is imparted from the heating element to the coil above it and to the upper surface of the lower coil.

The necessary current for the heating element is supplied from any convenient electrical outlet, such as the wall socket 15, by means of wires 16 leading to a switch 17 located at the lower front part of the casing 1, wires 18 leading from the switch to the element.

An auxiliary heating element may be provided, if necessary, at the upper part of the interior of the casing 1, for browning articles being cooked.

In order that the condition of the contents of the cooking vessels may be observed, without exposing them to chill, I preferably provide the door opening with double doors, the inner doors 20 being formed of transparent material and arranged to slide circumferentially of the interior of the casing 1.

From the construction described it will be seen that I have devised a heater and cooker which will satisfactorily attain the object of my invention as set out in the preamble of this specification. It will be seen that hot water is readily made available by supplying current to the element 13 by turning on the switch, that the same element may be used to cook foods contained in utensils supported on the coil 8, and that the device may be used in heating a room by leaving the door 3 open.

What I claim is:

1. In an electric heater and cooker, the combination of a double walled casing a pair of vertically spaced water coils, one end of the upper coil being in communication with one end of the lower coil, the other ends of said coils extending through the outer wall of the casing, one of said other ends being provided with a liquid receptacle and the other end with a discharge nozzle; and an electric heating element between said coils.

2. In an electric stove, a chamber having outer and inner walls suitably spaced and lined and a cover closing in the top, a coil of pipe having a liquid receiving end outside the chamber on one side and a faucet end beyond the other side, a plurality of clamps encircling the coil and having screw fasteners, and a resistance wire held in said clamps adjacent to said coil and supported thereby.

Signed at Toronto, Can., this 27th day of March, 1925.

JOHN H. WILLIAMS.